US007193356B2

(12) United States Patent
Kokubo et al.

(10) Patent No.: US 7,193,356 B2
(45) Date of Patent: Mar. 20, 2007

(54) IMAGE DISPLAY APPARATUS

(75) Inventors: Hisato Kokubo, Yokohama (JP); Kazuo Yoshioka, Nagasaki (JP); Hideki Itaya, Yokohama (JP); Hideki Teramatsu, Isehara (JP); Akimasa Yuuki, Tokyo (JP); Kyoichiro Oda, Tokyo (JP)

(73) Assignees: NEC-Mitsubishi Electric Visual System Corporation, Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 96 days.

(21) Appl. No.: 10/988,877

(22) Filed: Nov. 15, 2004

(65) Prior Publication Data

US 2005/0116609 A1 Jun. 2, 2005

(30) Foreign Application Priority Data

Nov. 28, 2003 (JP) ......................... P 2003-400400

(51) Int. Cl.
*H01J 63/04* (2006.01)
*F21V 7/04* (2006.01)
*G02F 1/1335* (2006.01)

(52) U.S. Cl. ......................... 313/495; 362/613; 349/70

(58) Field of Classification Search ................ 362/613, 362/230, 231, 295
See application file for complete search history.

(56) References Cited

U.S. PATENT DOCUMENTS

| | | | | |
|---|---|---|---|---|
| 6,249,328 | B1 * | 6/2001 | Fukuzawa et al. | 349/70 |
| 6,357,889 | B1 * | 3/2002 | Duggal et al. | 362/84 |
| 6,421,079 | B1 * | 7/2002 | Truc et al. | 348/96 |
| 2004/0008504 | A1 * | 1/2004 | Wang et al. | 362/31 |
| 2004/0052076 | A1 * | 3/2004 | Mueller et al. | 362/293 |
| 2004/0100796 | A1 * | 5/2004 | Ward | 362/231 |

FOREIGN PATENT DOCUMENTS

| | | | |
|---|---|---|---|
| JP | 2001-282190 | | 10/2001 |
| JP | 2002-0010653 | | 2/2002 |
| JP | 2002209230 | * | 7/2002 |
| JP | 2002-328048 | | 11/2002 |

* cited by examiner

*Primary Examiner*—Renee Luebke
*Assistant Examiner*—Evan Dzierzynski
(74) *Attorney, Agent, or Firm*—Scully, Scott, Murphy & Presser, P.C.

(57) ABSTRACT

An image display apparatus is provided that enables the chromaticity of a display screen of a display apparatus to be adjusted to the chromaticity desired by a user. The image display apparatus is formed by a backlight unit that is provided with a plurality of light sources and by an image display panel that is placed at a front surface of the backlight unit. The image display apparatus performs a monochrome display. In the image display apparatus, the light sources have at least three different types of luminescent colors that surround a target color on a chromaticity diagram.

10 Claims, 18 Drawing Sheets

| | x | y |
|---|---|---|
| P45 | 0.255 | 0.31 |

| | x | y | L | PWM |
|---|---|---|---|---|
| Lamp-A | 0.59453 | 0.286417 | 14.88719 | 16.47% |
| Lamp-B | 0.365235 | 0.538852 | 453.8611 | 100.00% |
| Lamp-C | 0.138504 | 0.108071 | 102.5052 | 48.63% |
| TOTAL | 0.255 | 0.31 | 571.2535 | |
| P45 | 0.255 | 0.31 | | |
| Δ | 1.46E-15 | 6.56E-16 | 2.12E-15 | |

| | x | y |
|---|---|---|
| P104 | 0.28 | 0.304 |

| | x | y | L | PWM |
|---|---|---|---|---|
| Lamp-A | 0.59453 | 0.286417 | 62.1993 | 68.82% |
| Lamp-B | 0.365235 | 0.538852 | 453.8611 | 100.00% |
| Lamp-C | 0.138504 | 0.108071 | 107.0017 | 50.76% |
| TOTAL | 0.28 | 0.304 | 623.0621 | |
| P104 | 0.28 | 0.304 | | |
| Δ | 1.9E-16 | 4.59E-15 | 4.78E-15 | |

| | x | y |
|---|---|---|
| P45 | 0.255 | 0.31 |

| | x | y | L | PWM |
|---|---|---|---|---|
| Lamp-A | 0.206882 | 0.237986 | 219.6732 | 66.10% |
| Lamp-B | 0.282099 | 0.380896 | 405.2491 | 100.00% |
| Lamp-C | 0.338881 | 0.261758 | 48.63651 | 25.99% |
| TOTAL | 0.255001 | 0.309997 | 673.5588 | |
| P45 | 0.255 | 0.31 | | |
| Δ | 1.09E-12 | 1.04E-11 | 1.15E-11 | |

| | x | y |
|---|---|---|
| P104 | 0.28 | 0.304 |

| | x | y | L | PWM |
|---|---|---|---|---|
| Lamp-A | 0.206882 | 0.237986 | 143.544 | 43.19% |
| Lamp-B | 0.282099 | 0.380896 | 348.8762 | 86.09% |
| Lamp-C | 0.338881 | 0.261758 | 187.149 | 100.00% |
| TOTAL | 0.279964 | 0.304185 | 679.5692 | |
| P104 | 0.28 | 0.304 | | |
| Δ | 1.32E-09 | 3.42E-08 | 3.56E-08 | |

(BACK:CENTER:PANEL)=(B SYSTEM:G SYSTEM : R SYSTEM)

IMAGE DISPLAY APPARATUS

BACKGROUND OF THE INVENTION

1. Field of the Invention

Priority is claimed on Japanese Patent Application No. 2003-400400, filed Nov. 28, 2003, the contents of which are incorporated herein by reference.

The present invention relates to an image display apparatus for displaying a monochrome image comprising a backlight unit that is provided with a plurality of light sources and an image display panel that is placed in front of the backlight unit.

2. Description of Related Art

Recent years have seen a rapid change in display apparatuses from those that use CRT as display devices to those that use liquid crystal panels as display devices. The most common display apparatuses that use liquid crystal panels as a display device (hereinafter, referred to as liquid crystal display apparatuses) are those that have light sources on a rear surface of a display panel (i.e., of a liquid crystal panel). Fluorescent lamps are often used for the light sources used in these liquid crystal display apparatuses. Fluorescent lamps characterized by having three wavelengths, namely, red, green, and blue (i.e., three wavelength fluorescent lamps) are used, and an optional color (i.e., chromaticity) is made by combining the respective wavelengths. However, even if a plurality of fluorescent lamps are used in a liquid crystal display apparatus, all of the fluorescent lamps that are used have the same luminescent color.

Moreover, among conventional liquid crystal display apparatuses, in order to solve the problem of it not being possible to easily adjust chromaticity, a liquid crystal display apparatus has become known that enables chromaticity adjustment, which has been difficult in a conventional liquid crystal display apparatus, to be performed inside a liquid crystal module using only an internal circuit extension of a controller (see for example Japanese Patent Application Laid-Open (JP-A) No. 2001-282190).

However, because all of the fluorescent lamps that are used have the same luminescent color even if a plurality of fluorescent lamps are used in a liquid crystal display apparatus, the problem has existed that it has not been possible to change the display screen chromaticity of the liquid crystal display apparatus.

Moreover, because the fluorescent materials corresponding to red, green, and blue that are used in the fluorescent lamps are different, the degree of deterioration when the fluorescent lamps are used for an extended period of time (i.e., changes of the time) is different in each. As a result, the emission intensity (i.e., the quantity of light) for each of red, green, and blue decreases at a different rate, and the ratios of the light generation intensities of the red, green, and blue that are emitted from the fluorescent lamps change. Therefore, the luminescent colors of the fluorescent lamps end up changing, resulting in the problem arising that the display screen chromaticity of the liquid crystal display apparatus also changes.

The present invention was conceived in view of the above circumstances, and it is an object thereof to provide an image display apparatus that enables the display screen chromaticity of the display apparatus to be adjusted to the chromaticity desired by the user.

It is a further object of the present invention to provide an image display apparatus that enables the display screen chromaticity to be kept substantially uniform by correcting changes in the luminescent color of the light source that are caused by the length of time the display apparatus is used for.

SUMMARY OF THE INVENTION

In the image display apparatus according to the present invention, a plurality of light sources emit at least three different color light which color coordinates surround a target color's coordinate on a chromaticity diagram.

Moreover, in the image display apparatus according to the present invention, it is possible to change emission intensity for each light source independently.

Moreover, in the image display apparatus according to the present invention, in order to improve color uniformity on a display screen, at least one light source has emission spectrums of two or more of the three primary colors of red, green, and blue.

Moreover, in the image display apparatus according to the present invention, the color coordinates of emitted light from the plurality of light sources are decided by predicting in advance an amount of change that is caused by an accumulation of the length of time the light sources are in active.

Moreover, in the image display apparatus according to the present invention, there are provided: a first step in which an emission intensity ratio of each of the plurality of light sources is determined such that a brightness and chromaticity of the display screen at a time T satisfy desired values; a second step in which a judgement is made as to whether or not the emission intensity ratios are between 0 and 100%; a third step in which, if the emission intensity ratio is between 0 and 100%, then the deterioration in the chromaticity and brightness of each light source at the time T+⊿T is calculated under assumption that a deterioration after a step time ⊿T with certain emission intensity ratio is equal to a deterioration after a time (emission intensity ratio×⊿T) with 100% emission intensity ratio; and a fourth step in which the brightness of 100% emission intensity ratio and the chromaticity at the time T=T+⊿T in each light source are calculated, and the amount of change that is caused by an accumulation of the length of time the light sources are in active is decided by repeating the first step through the fourth step with the time T taken as T=T+⊿T.

Moreover, in the image display apparatus according to the present invention, the image display apparatus further comprises: a device that detects emission intensities of the plurality of light sources; and a device that increases or decreases emission intensities of the plurality of light sources in accordance with an output from the device that detects emission intensities in order to keep the chromaticity and brightness of the display screen substantially constant.

Moreover, in the image display apparatus according to the present invention, the device that detects emission intensities comprises sensors that detect the respective emission intensities of red, green, and blue spectrums independently, and is further provided with a storage means that stores light source control data by which the sensor output is related to the light source emission intensity.

Moreover, in the image display apparatus according to the present invention, there is provided a data table of light source control data that is calculated from an emission intensity of each light source deterioration characteristics against emission time of each light source, and each light source is controlled by referring to the data table of light source control data.

Moreover, in the image display apparatus according to the present invention, the plurality of light sources are cold cathode fluorescent lamps.

Moreover, in the image display apparatus according to the present invention, the cold cathode fluorescent lamps are placed along an outer side of a display area of the image display panel, and greenish cold cathode fluorescent lamps are placed so as to be sandwiched by the cold cathode fluorescent lamps of the other luminescent colors.

Moreover, in the image display apparatus according to the present invention, the plurality of light sources are LED lamps.

According to the present invention, the effect is obtained that it is possible to adjust the chromaticity of a display screen of a display apparatus to the chromaticity desired by a user. In addition, by correcting the change in the luminescent colors of the light sources that are caused by use of the display apparatus, the effect is obtained that it is possible to keep the chromaticity of the display screen substantially constant.

BRIEF DESCRIPTION THE DRAWINGS

DETAILED DESCRIPTION OF THE INVENTION

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

The image display apparatus according to an embodiment of the present invention will now be described with reference made to the drawings.

(First Embodiment)

Figure 1:
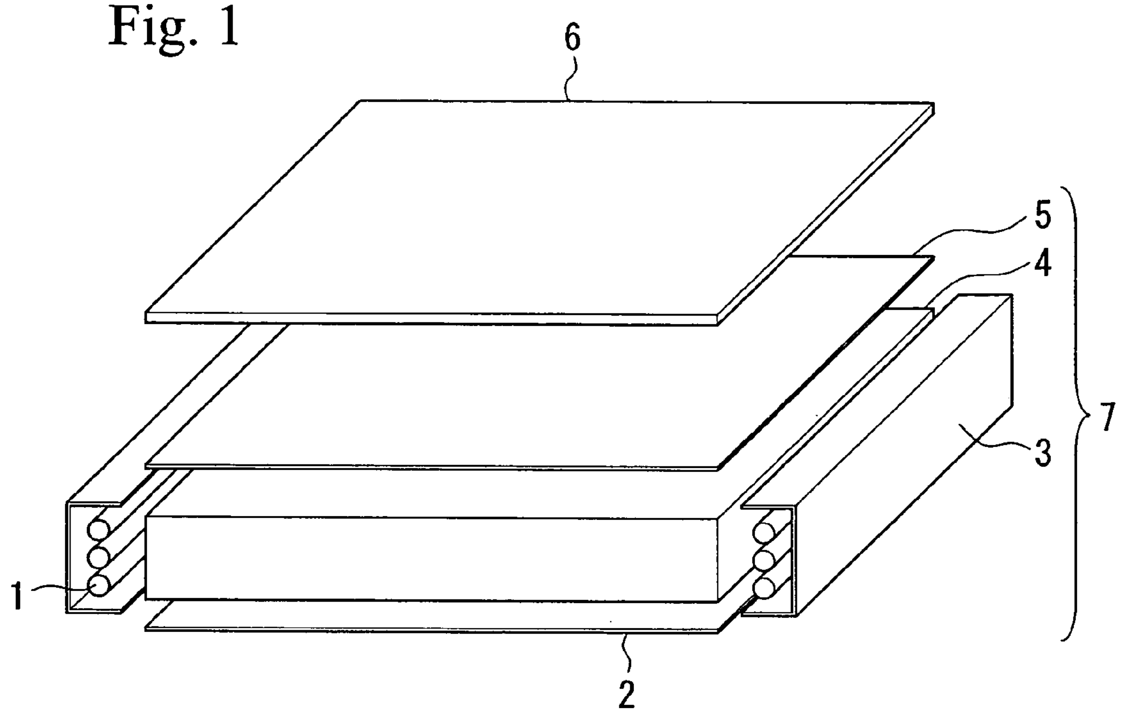
FIG. 1 is a view showing the structure of principal portions of an image display apparatus of an embodiment of the present invention.
Figure 2:
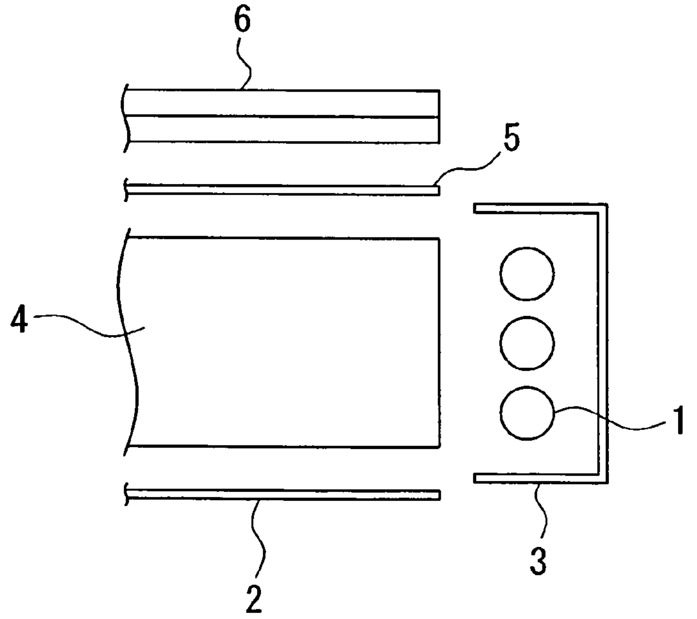
FIG. 2 is a view showing a layout of a cold cathode fluorescent lamp serving as a light source.
Figure 3:
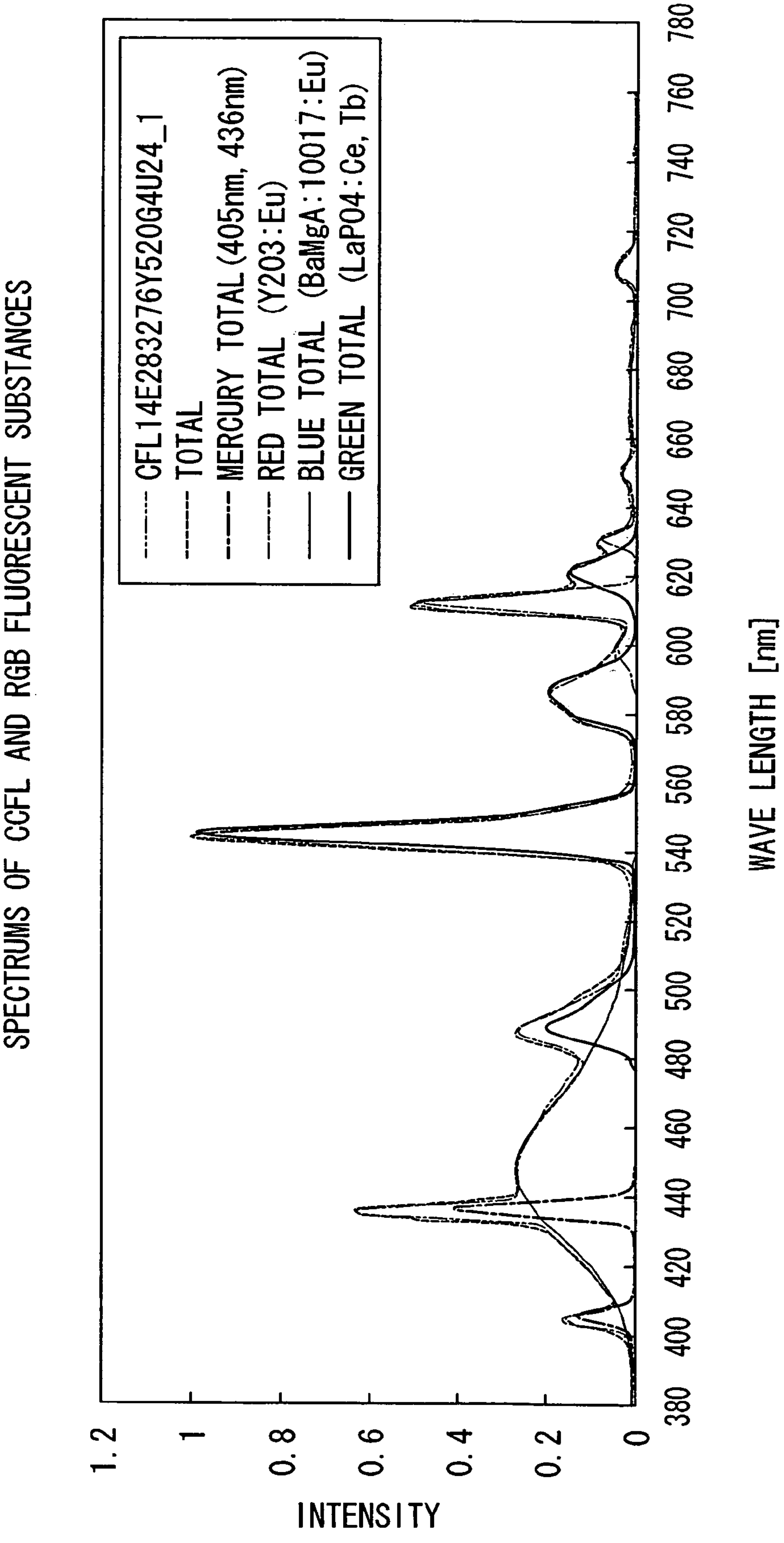
FIG. 3 is a view showing an emission spectrum of a fluorescent lamp.

The first embodiment of the present invention is described with reference of FIG. 1 to FIG. 3. FIG. 1 is a structural view showing principal portions of an image display apparatus that uses a liquid crystal display panel as a display device, as an example of the image display apparatus according to the present invention. FIG. 2 is a view showing an example of the layout of a cold cathode fluorescent lamp serving as a light source. FIG. 3 is a view showing an example of the emission spectrum of a fluorescent lamp.

As is shown in FIG. 1, this image display apparatus has a liquid crystal display panel 6 and a backlight unit 7, where the liquid crystal panel 6 being placed on the front surface of the backlight unit 7. The backlight unit 7 comprises a fluorescent lamp 1, a reflective plate 2, a reflector 3, an optical guide plate 4, and an optical sheet 5. As is shown in FIG. 2, three fluorescent lamps 1 are placed in parallel with the edge of the optical guide plate inside the reflector 3. The internal walls of the three fluorescent lamps 1 are coated with the red, green, and blue phosphors that are blended with different rate for each lamp such that light of a reddish lamp has a reddish hue compared with the target color, light of a bluish lamp has a bluish hue compared with the target color, and light of a greenish lamp has a greenish hue compared with the target color. FIG. 3 is an example of emission spectrums of the fluorescent lamps 1. Emission spectrums of a red phosphor, a green phosphor, and a blue phosphor overlap so as to provide a white color.

Figure 4:
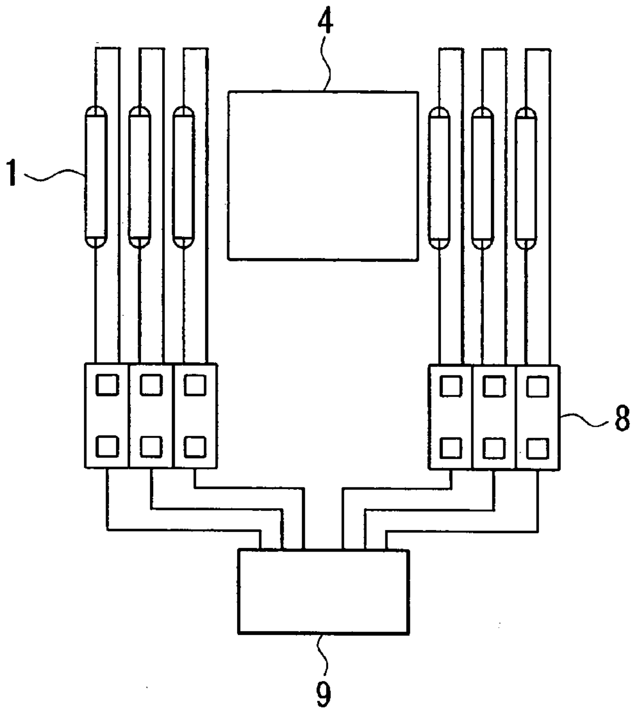
FIG. 4 is a view showing the block diagram of the lighting control system of a fluorescent lamp 1.

Furthermore, as is shown in FIG. 4, the three fluorescent lamps 1 are connected to the driving circuit 8 respectively, and the intensity of emitted light from each lamp can be controlled independently by lamp current control or ON and OFF ratio control switching on and off the lamps at high repeating cycle approximately 200 Hz performed by a lighting control circuit 9.

The light that is emitted from each fluorescent lamp 1 enters to the optical guide plate 4 from the end surface of the optical guide plate 4 either directly or after being reflected by the reflector 3, and propagates inside the optical guide plate 4 repeating reflection. Dot patterns that reflect light are formed on a front surface or rear surface of the optical guide plate 4, and light that strikes the dot patterns is reflected and is scattered from the surface on the opposite side of the optical guide plate 4 so as to pass through the liquid crystal panel 6 and be observed by a user. Accordingly, by adjusting the distribution of the dot patterns that reflect light, it is possible to make the surface brightness of the liquid crystal panel 6 uniform.

Figure 5:
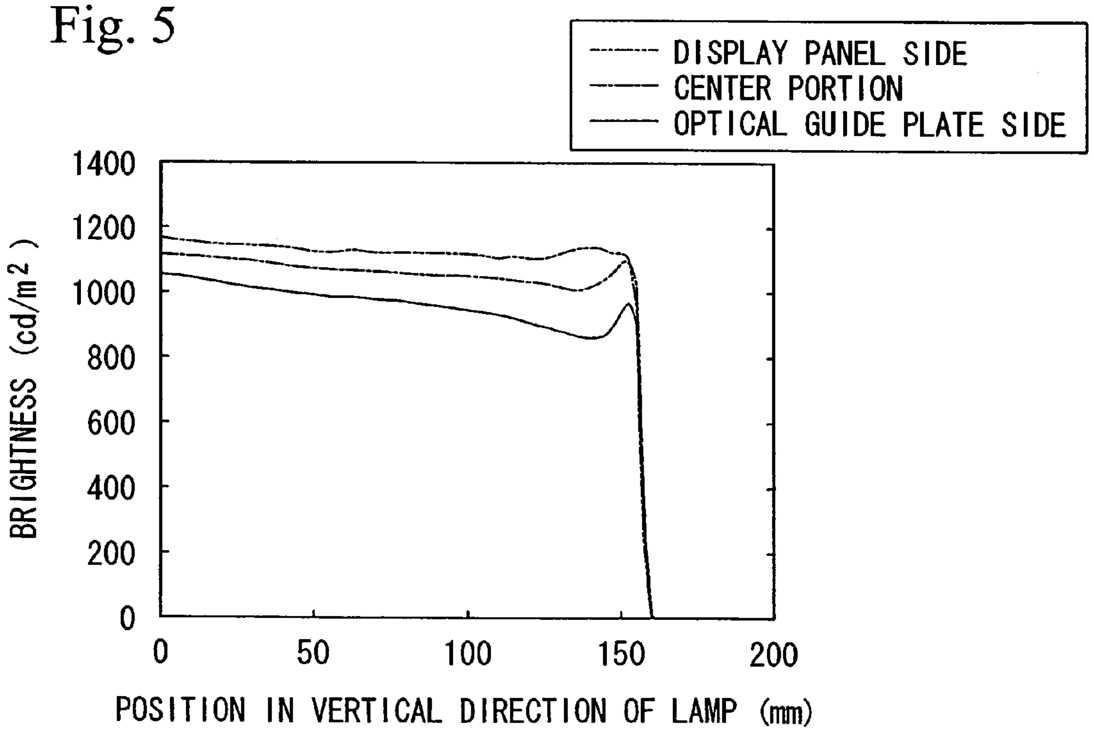
FIG. 5 is a view showing the brightness distribution of a liquid crystal display panel surface in the vicinity of a lamp when each fluorescent lamp is turned on individually.

FIG. 5 shows the brightness distribution of the liquid crystal panel 6 when the respective fluorescent lamps 1 are turned on. The center of the display area is 0 mm, while the edge (i.e., the vicinity of the lamp) of the display area corresponds to a position of 160 mm. In a center portion, the brightness distribution characteristics for each three fluorescent lamps are substantially flat. Because light emitted from the three fluorescent lamps 1 is irradiated through the liquid crystal panel in equal proportions, even if the colors of the three fluorescent lamps 1 are different from each other considerably, they become a color mixed at a uniform ratio with no coloring unevenness within the surface.

The chromaticity and brightness that are visually observed are determined by the emission spectrum and the intensity of light emitted from the three fluorescent lamps. The observed chromaticity can be exhibited as a chromaticity inside a triangle that is created using three chromaticity points when the respective chromaticities that are got when the respective fluorescent lamps are turned on are plotted on a chromaticity diagram (i.e., the CIE1931xy chromatic diagram).

Figure 6:
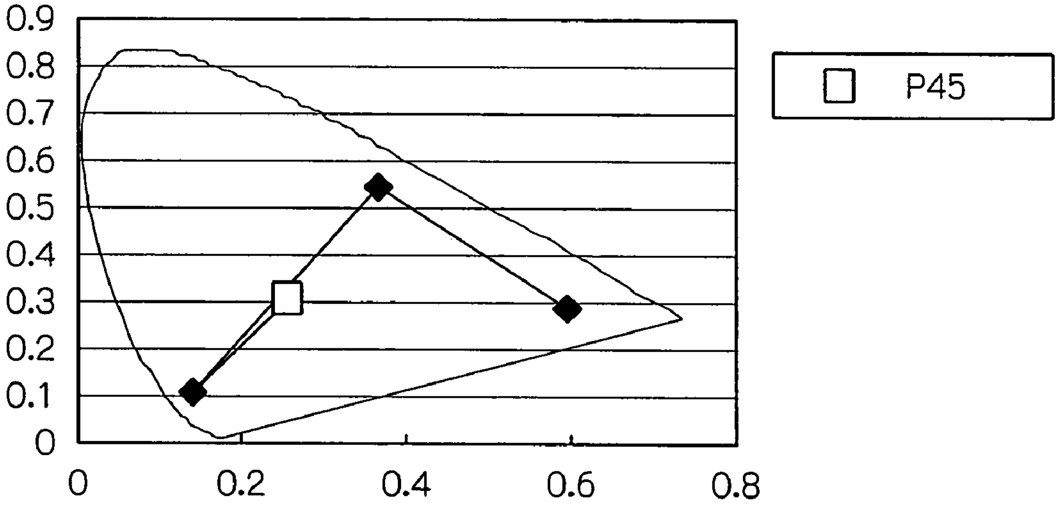
FIG. 6 is a view showing the brightness and the lighting time ratio of each fluorescent lamp when the chromaticity point of P45 is achieved.
Figure 7:
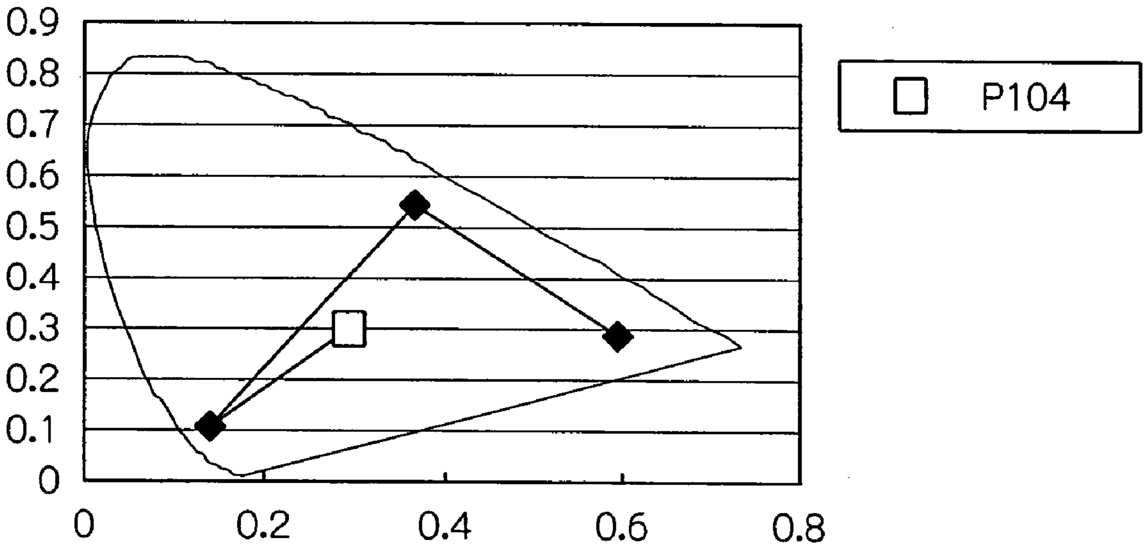
FIG. 7 is a view showing the brightness and the lighting time ratio of each fluorescent lamp when the chromaticity point of P104 is achieved.

FIG. 6 and FIG. 7 show the examples of the lighting time ratio of each fluorescent lamp and with which obtained brightness level in case of a target color point having chromaticity coordinates of x=0.255 and y=0.310 that is known as P45, and a target color point having chromaticity coordinates of x=0.280 and y=0.304 that is known as P104, when three primary color lamps are used for the fluorescent lamps.

Here, in case of P45, the lighting time ratio for red (Lamp-A), green (Lamp-B), and blue (Lamp-C) fluorescent lamps of 16%, 100%, and 48% respectively brings a bluish white P45 (x=0.255 and y=0.310) on the liquid crystal display panel 6 and a brightness of substantially 570 cd/$m^2$ (see FIG. 6). In the same way, for P104, the lighting time ratio for red, green, and blue fluorescent lamps of 68%, 100%, and 50% brings P104 (x=0.280 and y=0.304), and a brightness of substantially 623 cd/$m^2$ (see FIG. 7). In these examples, a description is given as a method in which the adjustment of the intensity of light of each fluorescent lamp is performed by lighting time ratio control, however, the light intensity adjustment method is not limited to this and it is also possible to adjust the lamp current supplied to the fluorescent lamps.

(Second Embodiment)

As is shown in FIG. 5, when fluorescent lamps 1 having three different luminescent colors are used, a uniform color and brightness is obtained in the center portion of the liquid crystal display panel 6, however, in the vicinity of the ends of the optical guide plate 4 near to the fluorescent lamps 1, the distribution of light that is emitted from the three fluorescent lamps and radiated to the liquid crystal display panel 6 from the backlight unit 7 is different from at center portion, that is, in the vicinity of the ends of the optical guide plate 4, the radiation of the light from the fluorescent lamp 1 that is positioned on the nearest side of the reflective plate 2 is abruptly attenuated. Accordingly, in case the luminescent colors of the three fluorescent lamps 1 are different, at end portions of the liquid crystal display panel 6 near the fluorescent lamps 1, coloring unevenness will occur because the color of the light radiated to the liquid crystal display panel 6 changes depending on the distance from the fluorescent lamps 1.

Figure 8:
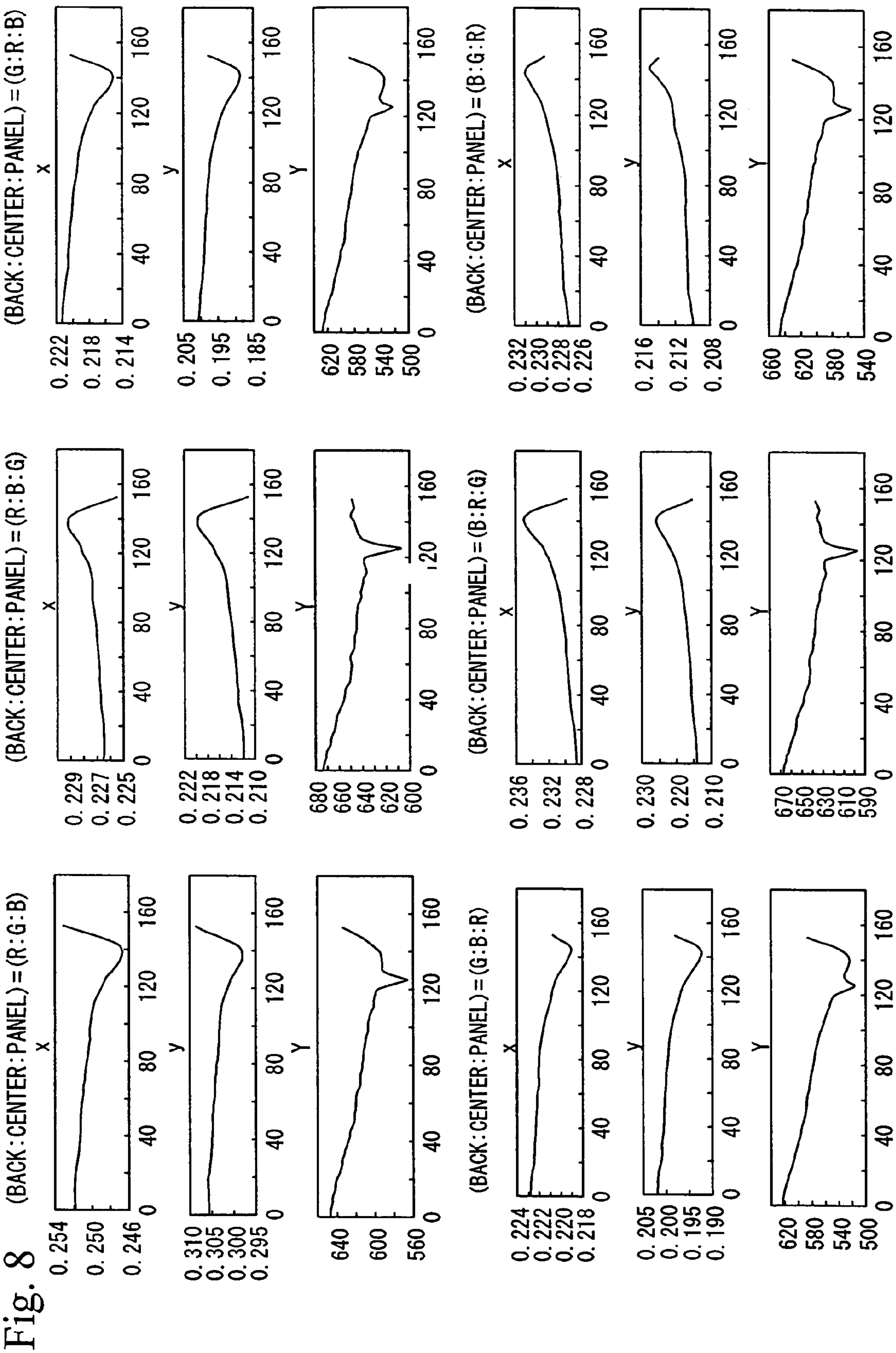
FIG. 8 is a view showing differences in coloring unevenness when the layout of the three fluorescent lamps is changed.

FIG. 8 shows differences in coloring unevenness at the vicinity of the fluorescent lamps 1 when the layout of the red, green, and blue fluorescent lamps is changed. As is shown in FIG. 8, when the green (G) is in the center, it can be seen that the changes of the chromaticity coordinates xy are small. Generally, when the three fluorescent lamps 1 are arranged in parallel with the end surface of the optical guide plate 4, symmetrical brightness characteristics relative to the center are shown. Therefore, it is desirable that the fluorescent lamp with the highest luminosity (i.e., the highest brightness) is placed in the center, and the fluorescent lamp having the longer wavelength and the fluorescent lamp having the shorter wavelength are placed at the two ends. From the result shown in FIG. 8, it can be seen that when blue is placed on the reflective plate 2 side, green is placed in the center, and red is placed on the liquid crystal display panel 6 side, then the coloring unevenness is minimum of 0.004 for a change of x and 0.005 for a change of y.

(Third Embodiment)

Figure 9:
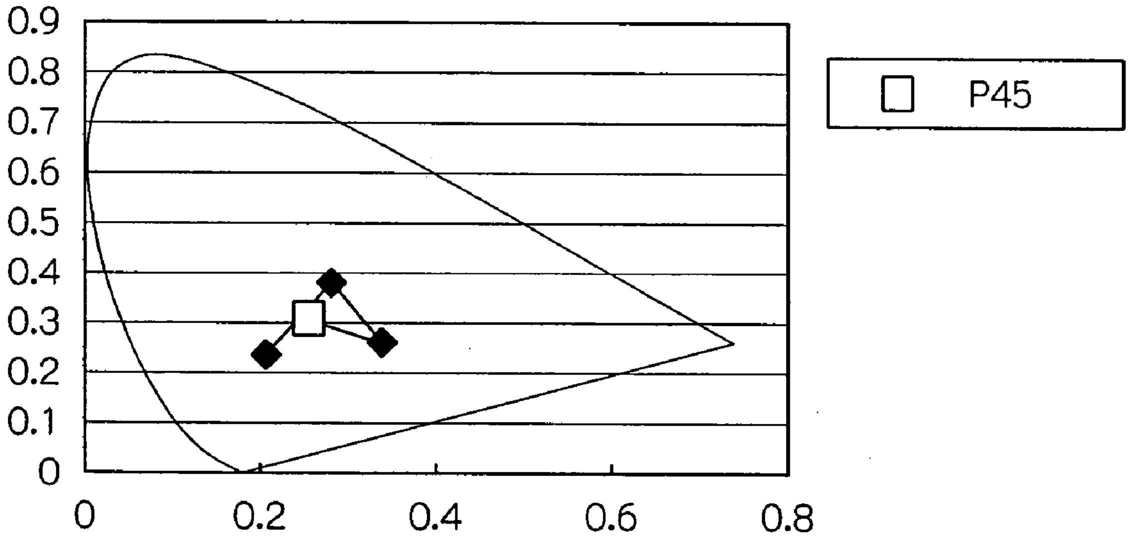
FIG. 9 is a view showing the brightness and the lighting time ratio of each fluorescent lamp when the chromaticity point of P45 is achieved.
Figure 10:
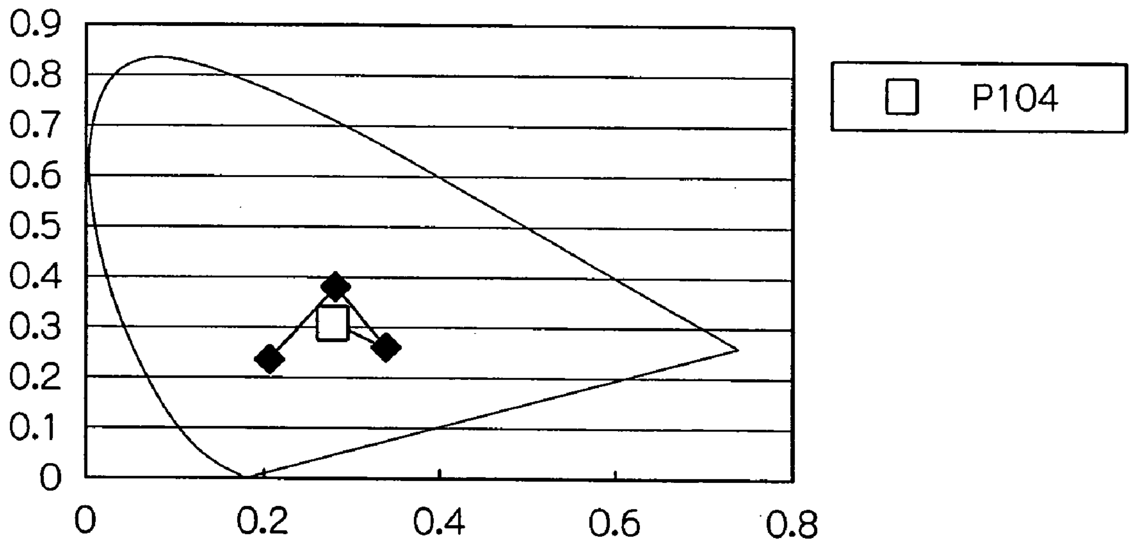
FIG. 10 is a view showing the brightness and the lighting time ratio of each fluorescent lamp when the chromaticity point of P104 is achieved.

The human eye has the ability to identify the differences of approximately 0.002 in chromaticity coordinates x and y. In order to reduce coloring unevenness at the display surface, it is effective to make the colors of the three fluorescent lamps 1 close to each other. FIG. 9 and FIG. 10 show the examples using a reddish fluorescent lamp in which phosphor having red and green emission spectrums are mixed with a ratio of (red 5: green 5), a greenish fluorescent lamp in which phosphor having green and blue emission spectrums are mixed with a ratio of (green 8: blue 2), and a bluish fluorescent lamp in which phosphor having red and green and blue emission spectrums are mixed with a ratio of (red 68: green 17: blue 15). The lighting colors of the respective fluorescent lamp are all similar colors, and the color reproduction range is narrow, as is shown in FIG. 9 and FIG. 10. However, it is possible to realize the white colors of P45 and P104 by lighting intensity ratio adjustment of the three fluorescent lamps. Furthermore, when this combination is used, the lighting brightnesses are 673 cd/$m^2$ and 679 cd/$m^2$, which are higher than when the single color phosphor lamps of the first embodiment are used. This is because a large lighting intensity ratio is allocated to the fluorescent lamp 1 that has a color close to the target chromaticity coordinates.

Figure 11:
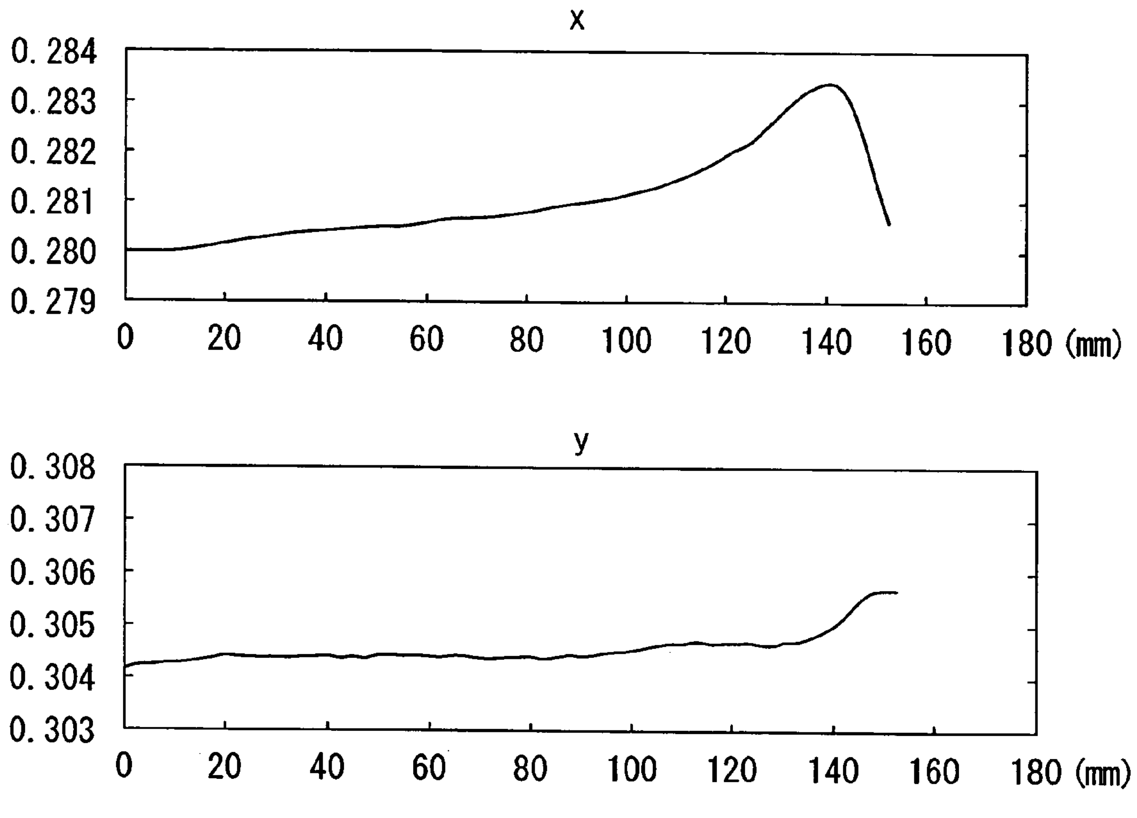
FIG. 11 is a view showing an example of coloring unevenness in the vicinity of a fluorescent lamp.

FIG. 11 shows a state of coloring unevenness at the vicinity of three fluorescent lamps used in this combination. As can be seen from FIG. 11, the coloring unevenness at the vicinity of the fluorescent lamps is improved to approximately the observable limits of 0.003 and 0.002 in the amplitudes of change of x and y.

(Fourth Embodiment)

Generally, phosphors of fluorescent lamps deteriorate as the lighting time lengthens, and the light emitting efficiency is reduced. The speed of this deterioration differs for each phosphor, and, as is shown in FIG. 12, the deterioration of a blue phosphor is particularly fast.

Figure 13:
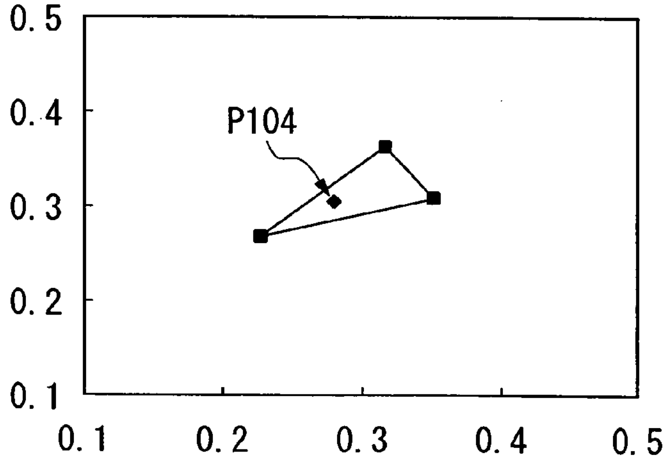
FIG. 13 is a view showing the initial chromaticity point of each fluorescent lamp.
Figure 14:
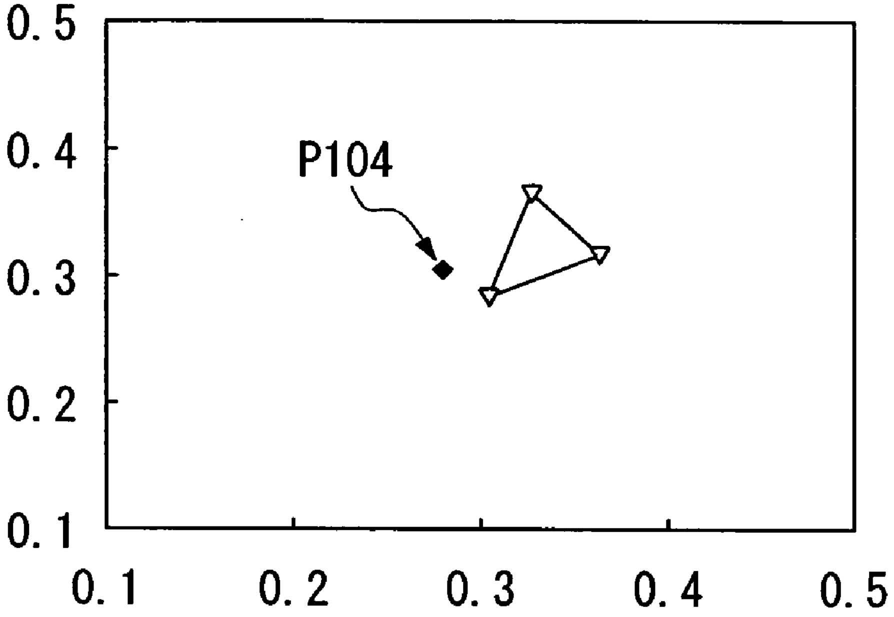
FIG. 14 is a view showing the chromaticity point of each fluorescent lamp after 50,000 hours.

Therefore, not only is there a drop in brightness accompanying the deterioration of the fluorescent lamp, but also a color shift to the direction of yellow. For example, when a fluorescent lamp in which phosphors having red and green and blue emission spectrums are mixed with a ratio of (0.3:0.45:0.25) is used as a reddish fluorescent lamp, a fluorescent lamp in which phosphors having red and green and blue emission spectrums are mixed with a ratio of (0:0.82:0.18) is used as a greenish fluorescent lamp, and a fluorescent lamp in which phosphors having red and green and blue emission spectrums are mixed with a ratio of (0:0.16:0.84) is used as a bluish fluorescent lamp, the triangle on a chromaticity diagram appears in the manner shown in FIG. 13, and it is possible to encompass the target color coordinates (for example, P104). However, if the color coordinates after, for example, 50,000 hours in this fluorescent lamp combination are calculated based on the deterioration characteristics shown in FIG. 12, then the results are as is shown in FIG. 14, with P104 moved outside the triangle and P104 is no longer obtainable.

Figure 15:
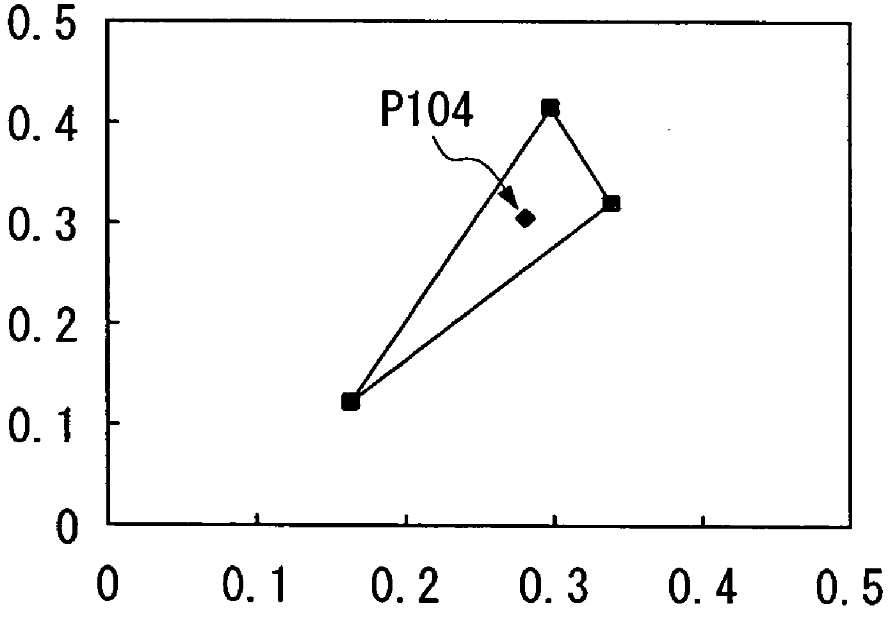
FIG. 15 is a view showing the initial chromaticity point of each fluorescent lamp.
Figure 16:
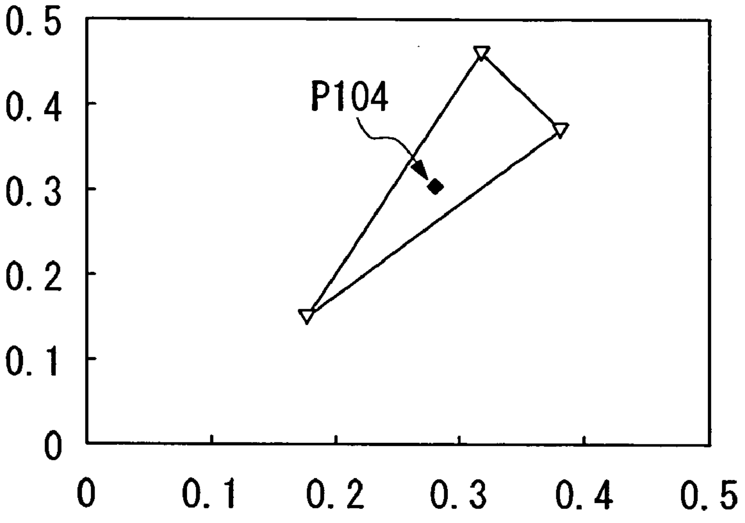
FIG. 16 is a view showing the chromaticity point of each fluorescent lamp after 50,000 hours.

In contrast to this, if the shifts in the chromaticity of each fluorescent lamp caused by the differences in the rate of deterioration of the phosphors are considered in advance, and the mixing ratios of the red, green, and blue phosphors in each fluorescent lamp are determined based on above consideration, then, as is shown in FIG. 15 and FIG. 16, it is possible to keep the target color coordinates inside the triangle even after the desired time has passed. Here, a fluorescent lamp in which phosphors having red and green and blue emission spectrums are mixed with a ratio of (0.38:0.41:0.21) is used as a reddish fluorescent lamp, a fluorescent lamp in which phosphors having red and green and blue emission spectrums are mixed with a ratio of (0:0.82:0.18) is used as a greenish fluorescent lamp, and a fluorescent lamp in which phosphors having red and green and blue emission spectrums are mixed with a ratio of (0:0.15:0.85) is used as a bluish fluorescent lamp.

Figure 12:
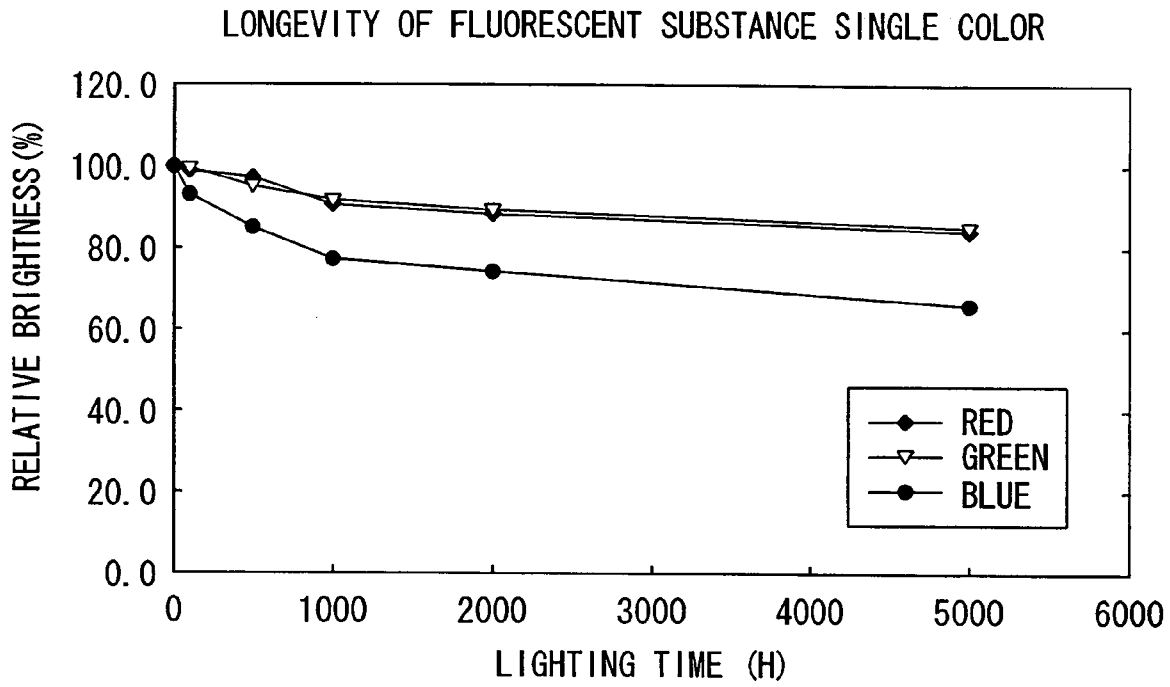
FIG. 12 is a view showing the relationship between the lighting time and the deterioration of the phosphors of each color.
Figure 17:
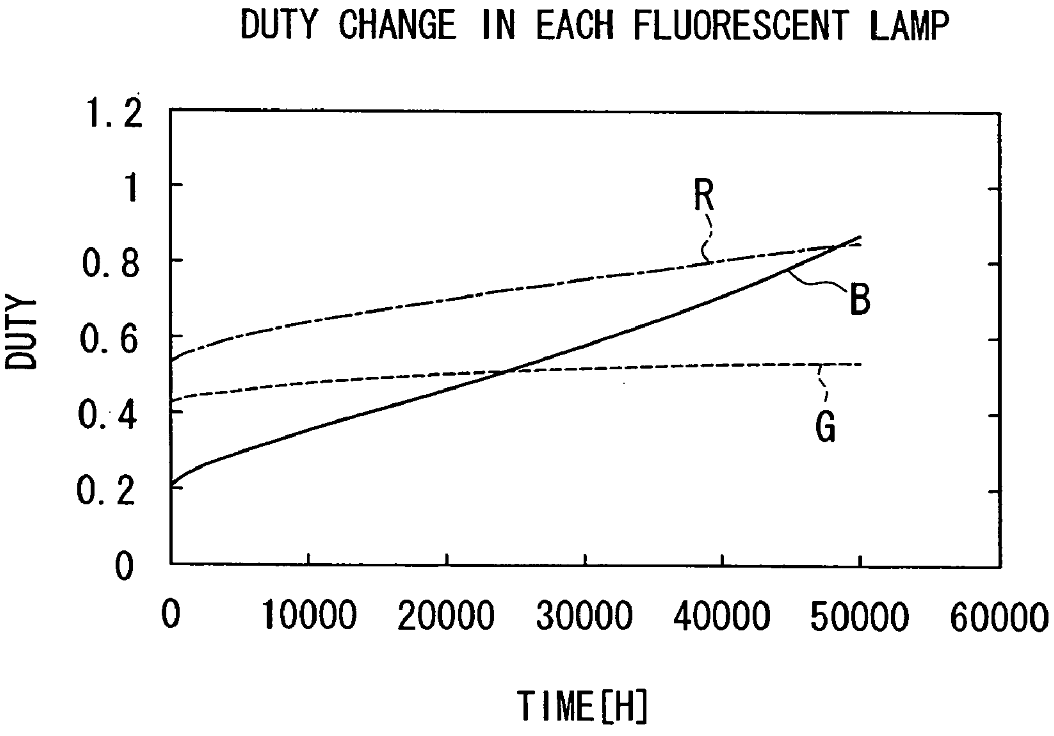
FIG. 17 is a view showing the lighting time ratio of each fluorescent lamp until 50,000 hours.
Figure 18:
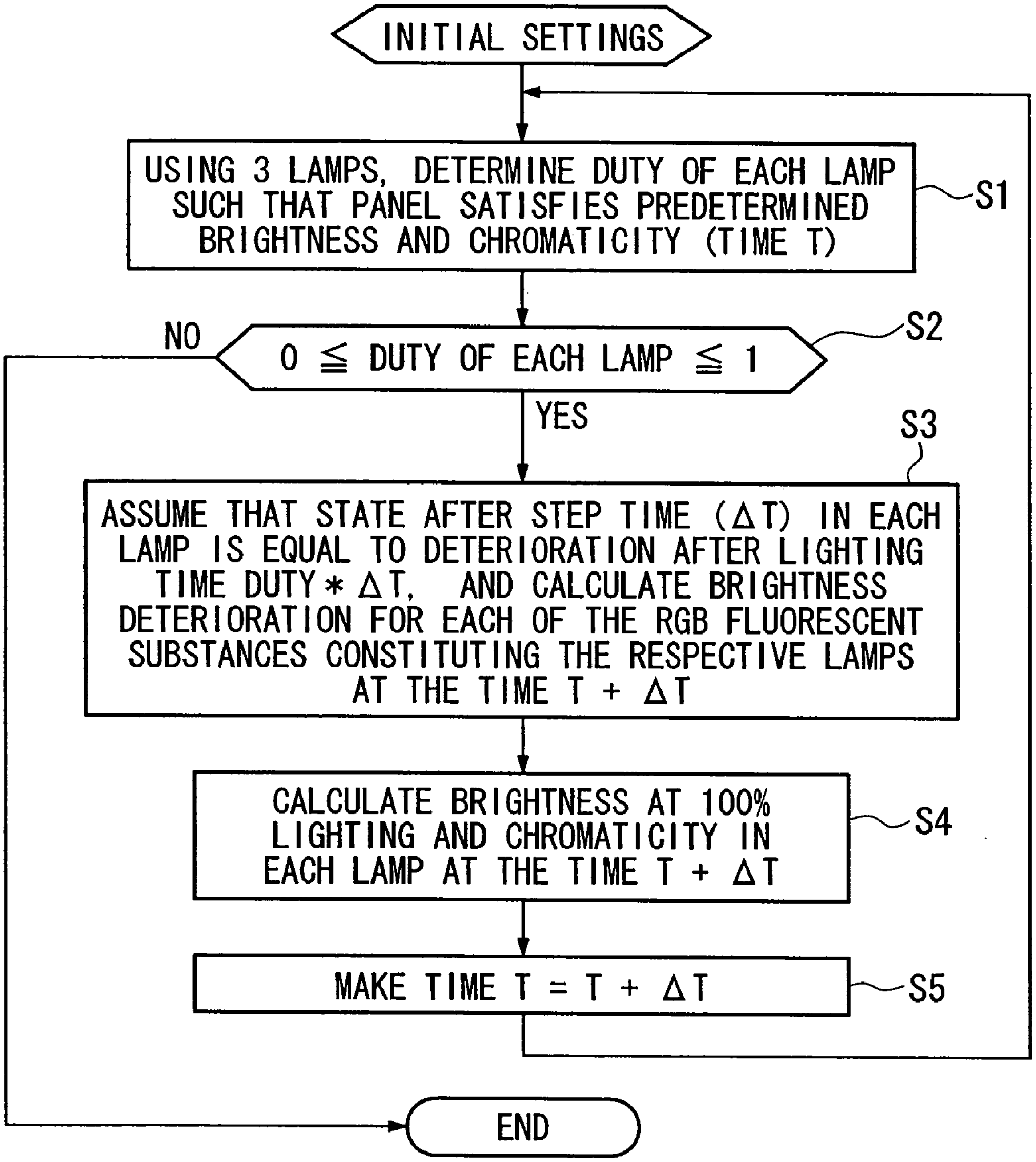
FIG. 18 is a view showing a method of calculating lighting control signal setting values from the degradation characteristics of the red, green, and blue phosphors used in the fluorescent lamps and the mixing ratio of the phosphors in each fluorescent lamp.

Furthermore, in FIG. 17, the results of a lighting time ratio simulation to maintain a constant brightness and chromaticity are shown in which, based on the deterioration data of each phosphor shown in FIG. 12, the deterioration in each phosphor in a fluorescent lamp is estimated from an accumulated actual lighting time of the fluorescent lamps controlled by the lighting time ratio (PWM) control, that is switching on and off the lamps at high repeating cycle approximately 200 Hz and the lighting time ratio to compensate the changes in the chromaticity and brightness caused by deterioration of the phosphors is calculated. A calculation algorithm for conducting this simulation will now be described with reference to FIG. 18.

Firstly, the lighting time ratios (Duty) of each fluorescent lamp are determined such that the liquid crystal display panel 6 realizes a predetermined brightness and chromaticity at a time T (step S1). Next, a judgement is made as to whether or not the lighting time ratio of each lamp is between 0 and 1 (step S2). If the lighting time ratio is not between 0 and 1, it is determined that the deterioration exceeds a correctable range, and the routine is ended. If, however, the lighting time ratio is between 0 and 1, then, the brightness deterioration is calculated for each of the RGB phosphors in the respective lamps at the time T+⊿T under assumption that the deterioration after a step time (⊿T) is equal to the deterioration when lighting has continued for a time (Duty*⊿T) in each fluorescent lamp (step S3). Next, the chromaticity and brightness at 100% lighting time ratio at the time T+⊿T are calculated for each fluorescent lamp (step S4). The time T is then set to T=T+⊿T (step S5), and steps S1 to S5 are repeated.

Here, if the lighting time ratio ("Duty" in the drawings) exceeds 1, namely, exceeds 100%, then this means that it is no longer possible to input any further power into that fluorescent lamp, and the correction of the brightness or chromaticity is no longer possible. In the example in FIG. 17, the lighting time ratio is less than 1 even after 50,000 hours have passed, so it is possible to maintain and achieve the initial brightness and chromaticity.

As has been described above, by considering the shifts in the chromaticity of each fluorescent lamp that are caused by the differences in the rate of deterioration of the phosphors, and then determining the mixing ratios of the red, green, and blue phosphors in each fluorescent lamp in advance, and then, by turning on each fluorescent lamp with changing of the lighting time ratio as is shown in FIG. 17, it is possible to keep the desired chromaticity and brightness substantially constant within the anticipated usage time.

(Fifth Embodiment)

Figure 19:
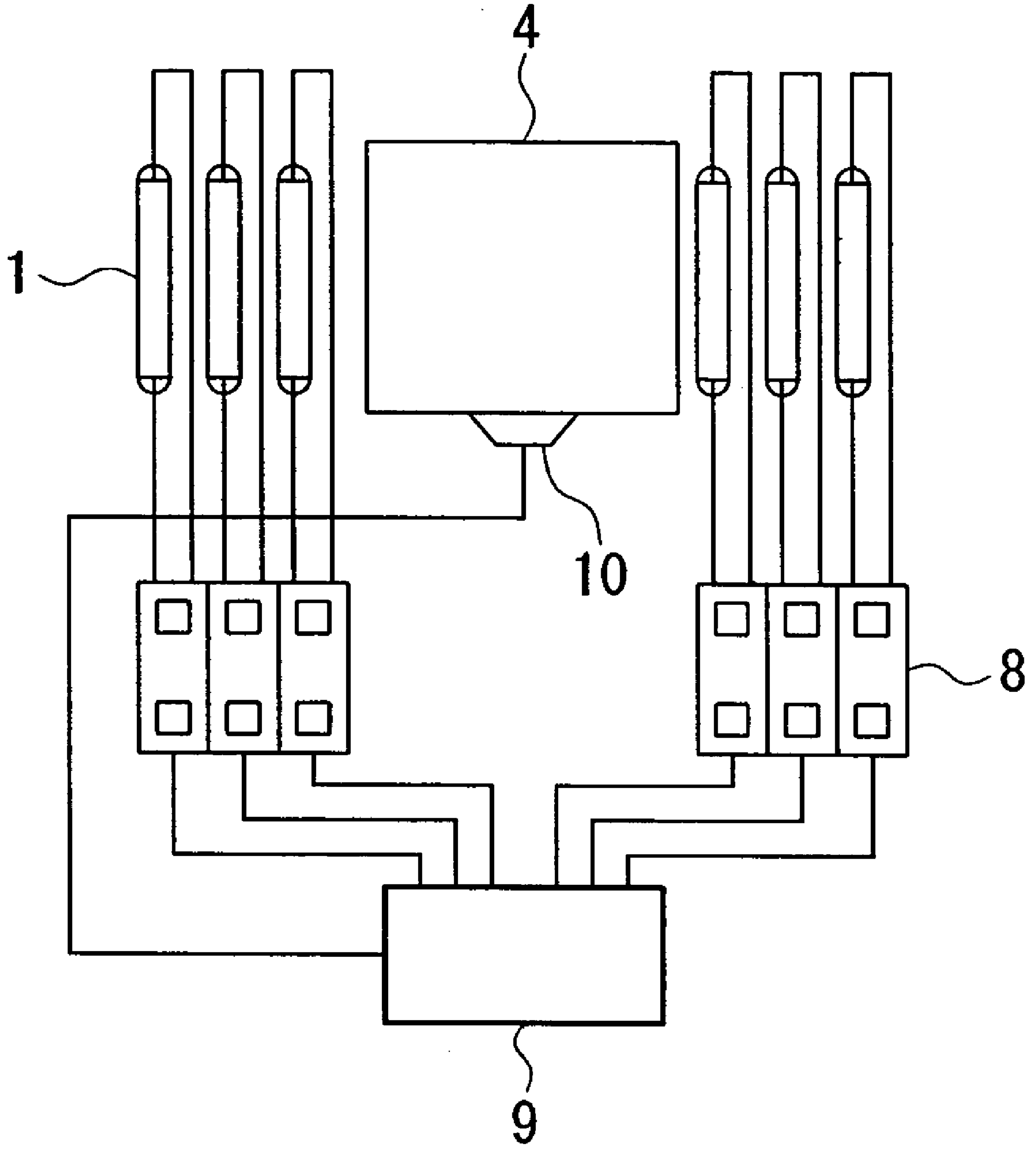
FIG. 19 is a view showing the block diagram of a lighting control system of fluorescent lamp 1.
Figure 20:
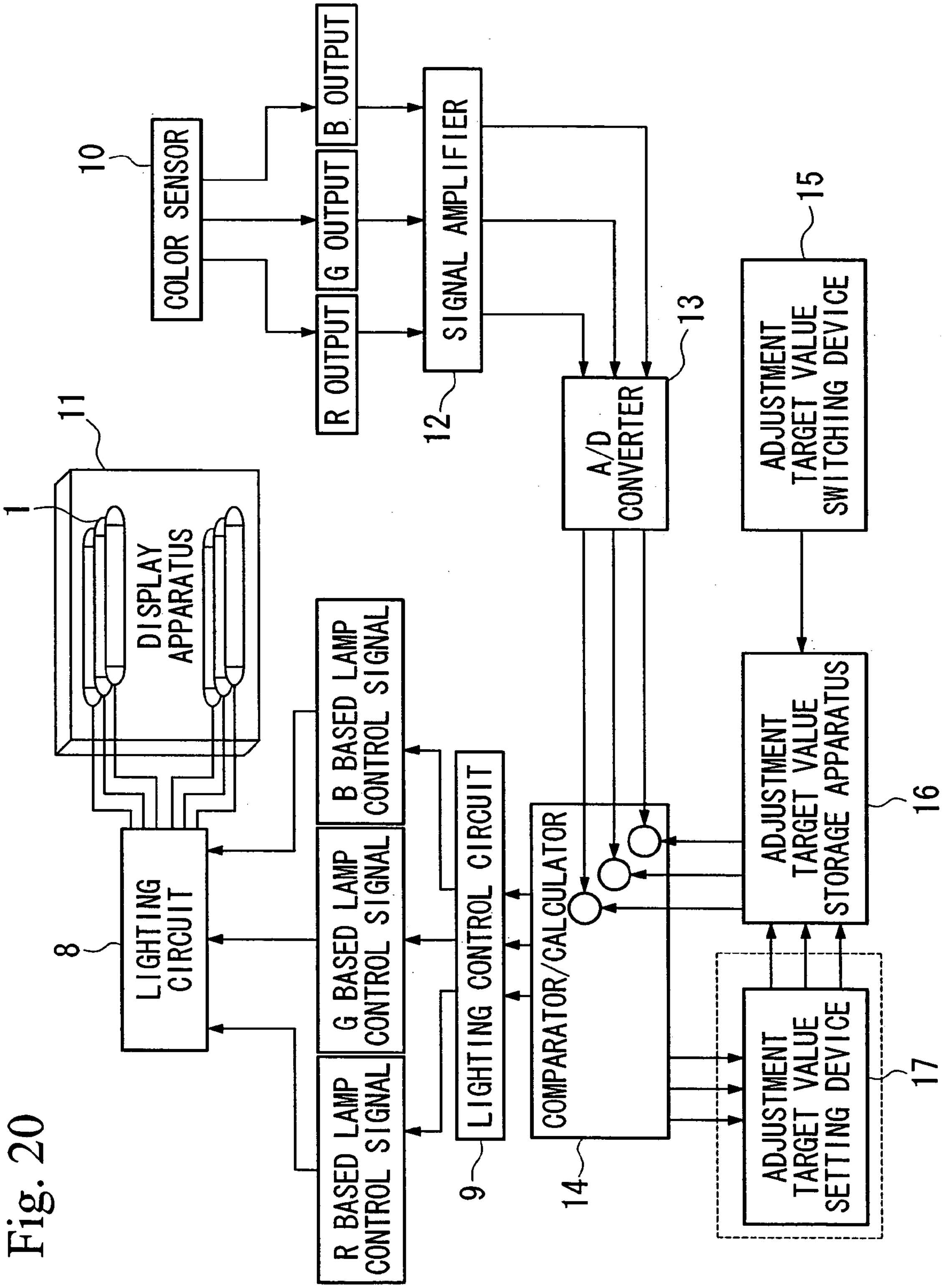
FIG. 20 is a view showing detailed block diagram of a lighting control system of fluorescent lamp 1.

Next, while referring to FIG. 19, a description will be given of a liquid crystal display apparatus that is provided with a color sensor 10 in the structure shown in FIG. 4. FIG. 20 is a block diagram showing the detailed structure of the liquid crystal display apparatus shown in FIG. 19. A color sensor 10 has a different spectral sensitivity for each of the red, green, and blue wavelength regions, and outputs an electrical signals changing in accordance with changes of the energy of each wavelength component in light that is irradiated onto a light receiving section of the color sensor 10. Moreover, the color sensor 10 is fixed to a position where it is able to detect the changes in the irradiation energy of a fluorescent lamp 1 that is turned on by the driving circuit 8, either directly, or using an optional optical guide mean. Each output signal from the color sensor 10 is amplified to an optimum signal amplitude by a signal amplifier 12. Amplified signals are converted into digital signals by an A/D converter 13 that has a resolution that enables it to obtain the chromaticity and brightness adjustment accuracy that the liquid crystal display apparatus 11 is aiming to achieve. In an adjustment target value storage mean 16, an adjustment target value of digitized output signal of color sensor 10 is stored. Here the adjustment target values are equal to the output value of A/D converter 13 obtained when the chromaticity and brightness are adjusted to the target value that the liquid crystal display apparatus 11 is aiming to achieve by using an adjustment target value setting mean 17 that is capable of measuring chromaticity and brightness. In addition, these adjustment target values can be stored for a plurality of conditions, and the display conditions, and then the adjustment target values can be switched by an adjustment target value switching mean 15 that comprises a control key or the like provided externally. By using the adjustment target value setting mean 17 that is capable of measuring chromaticity and brightness, adjustment target values that are set in the adjustment target value storage mean 16 can be altered as desired.

The fluorescent lamp 1 is turned on by independent control signals for each fluorescent lamp, that is, reddish, greenish, and bluish lamps generated by a lighting control circuit 9 that are based on the display conditions selected by a user of the liquid crystal display apparatus.

Lights irradiated by the fluorescent lamps 1 are mixed in color inside the optical guide plate 4 comprised in the liquid crystal display apparatus 11. At this time, the color sensor 10 detects the color mixed light, and outputs the electrical signals corresponding to the energy quantities in each of the red, green, and blue wavelength regions to the signal amplifier 12. These electrical signals are then converted into digital signals by the A/D converter 13. These digitized values are then compared by a comparator/calculator 14 with the values that have been selected by the adjustment target value switching mean 15 for selected condition from the values stored in the adjustment target value storage mean 160. In accordance with the difference between the sensor output values and the adjustment target values, lighting control signals for the respective fluorescent lamps that are output by the lighting control circuit are altered such that the sensor output values approaches the adjustment target values. The brightness of each fluorescent lamp changes in accordance with the altered lighting control signals, and this brightness change is detected by the color sensor 10. The brightness after change is converted to an electrical signal by the color sensor 10, and a comparison of the sensor output values and the adjustment target values are repeated. These electrical signals are then converted into digital signals by the A/D converter 13. These digitized values are then compared by a comparator/calculator 14 with the values that have been selected by the adjustment target value switching mean 15 for selected condition from the values stored in the adjustment target value storage mean 16. In accordance with the difference between the sensor output values and the adjustment target values, lighting control signals for the respective fluorescent lamps that are output by the lighting control circuit are altered such that the sensor output values approaches the adjustment target values. The brightness of each fluorescent lamp changes in accordance with the altered lighting control signals, and this brightness change is detected by the color sensor 10. The brightness after change is converted to an electrical signal by the color sensor 10, and a comparison of the sensor output values and the adjustment target values are repeated.

By repeating comparison of the sensor output values with the adjustment target values stored in the adjustment target value storage mean 16 and then changing the brightness of each lamp such that the sensor output values approaches the adjustment target values via the lighting control circuit 9, the chromaticity and brightness of the liquid crystal display apparatus 11 can be maintained substantially constant without being dependent on differences in the deterioration characteristics of each color phospher.

(Sixth Embodiment)

Figure 21:
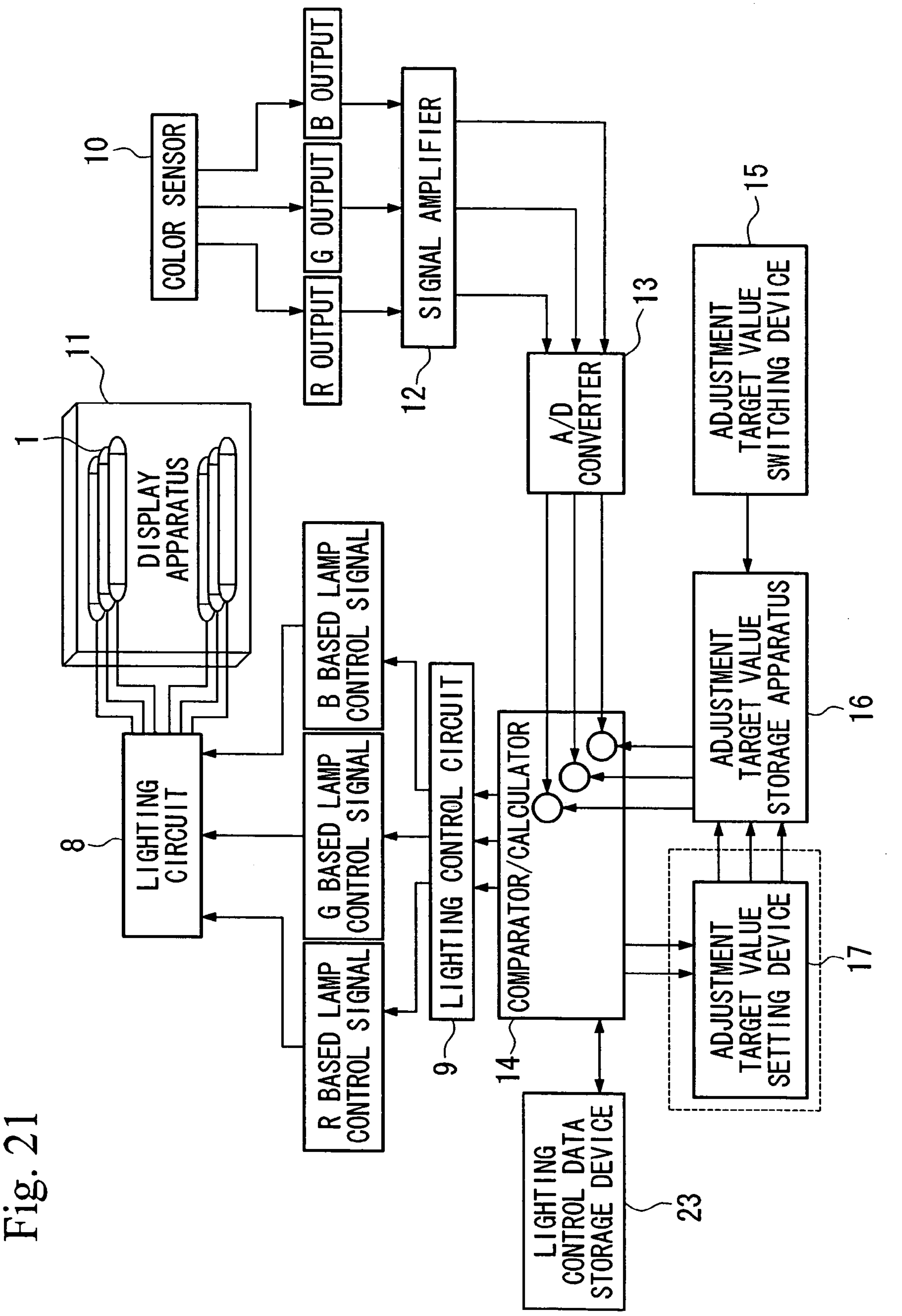
FIG. 21 is a view showing detailed block diagram of a lighting control system of fluorescent lamp 1.

FIG. 21 shows a lighting control data storage mean 23 added to the constitutional block diagram shown in FIG. 20. The color sensor 10 outputs electrical signals correspond to the energy quantities in each of the red, green, and blue wavelength regions, on the other hand, in each fluorescent lamp phosphors having red, green, and blue emission spectrums are mixed in fixed proportions, and then the detected signals in the color sensor 10 do not correspond to the object being controlled. As an example, in case of using the fluorescent lamps (Lamp-A, Lamp-B, and Lamp-C) shown in FIG. 9 and FIG. 10, if only the control signal for the greenish fluorescent lamp is altered when the output from the color sensor 10 for green is greater than the adjustment target value, the blue emission intensity is also weakened. In the other words, it is not absolutely essential to alter the control signal for the greenish fluorescent lamp, but also possible to alter the control signals for the reddish and/or bluish fluorescent lamps.

As a countermeasure to this phenomenon, it is proposed to store the most appropriate control data for each fluorescent lamp to alter the emission intensity of a specific color decided from the mixing ratios of the phosphors in each fluorescent lamp in a lighting control data storage mean 23. The comparator/calculator 14 then determines which fluorescent lamps are required to be altered by referring to the data that is stored in the control data storage mean 23 based on comparison of the output data from the A/D converter 13 and the values stored in the adjustment target value storage mean 16, after that the comparator/calculator 14 alters the control signal for that fluorescent lamp. As a result, it is possible to implement smooth adjustment to the target values.

(Seventh Embodiment)

Figure 22:
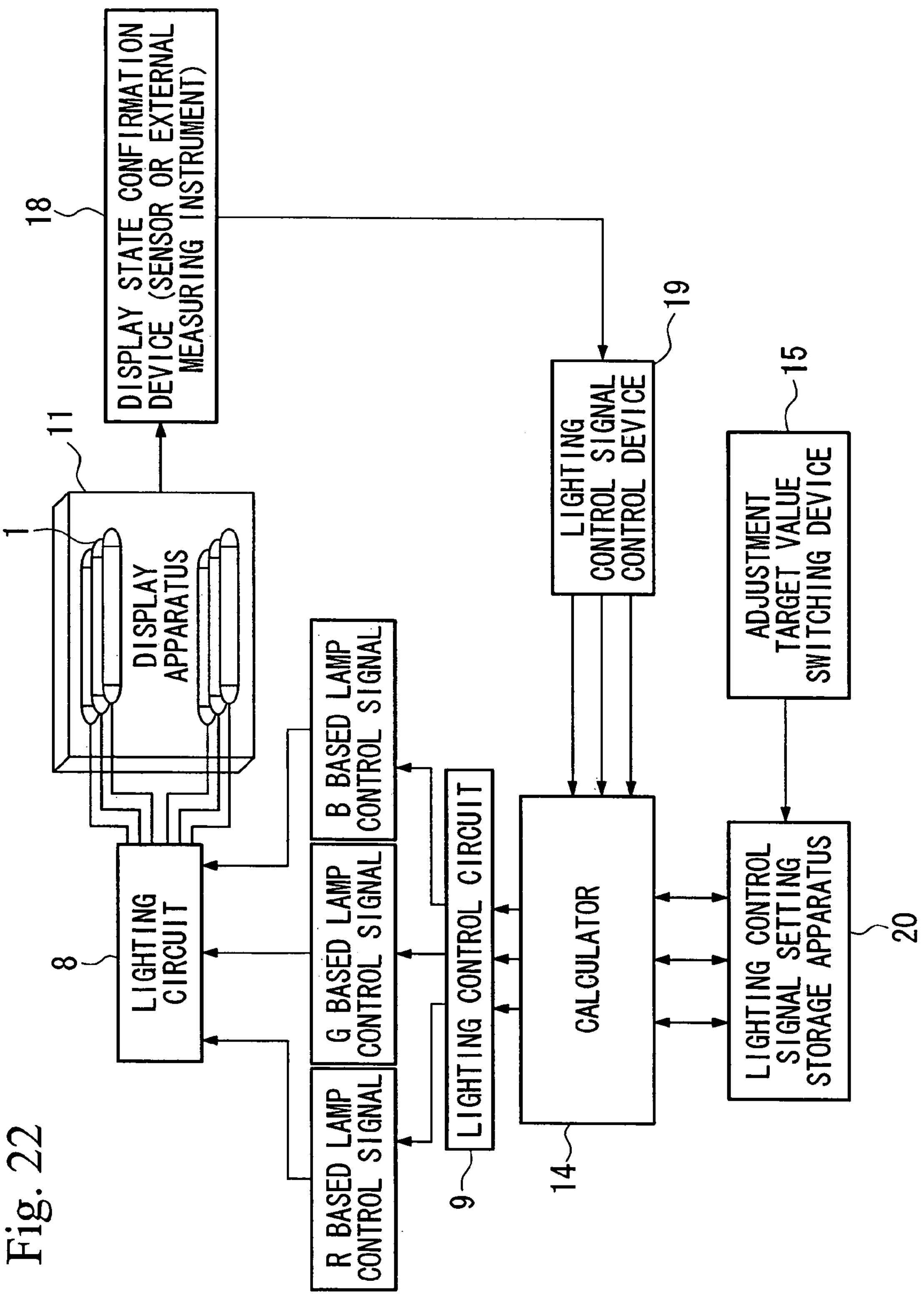
FIG. 22 is a view showing detailed block diagram of a lighting control system of fluorescent lamp 1.

FIG. 22 is a constitutional block diagram based on manual control. A display state confirmation mean 18 determines display conditions of the liquid crystal display apparatus 11, and the method for that is optionally selected by a user of the liquid crystal display apparatus. Control mean of the lighting control signal 19 is able to be controlled by the operation of an externally provided control key or by communication with an externally provided apparatus. Moreover, a lighting control signal setting value storage mean 20 is able to store the lighting control signal setting values that have been predetermined in advance or the lighting control signal setting values that are controlled by the control mean of the lighting control signal 19. These lighting control signal setting values can be stored for a plurality of display conditions, and the display conditions can be switched by using the adjustment target value switching mean 15 that comprises an externally provided control key or the like.

The fluorescent lamp 1 is turned on by independent control signals for each reddish, greenish, and bluish fluorescent lamp generated by a lighting control circuit 9 and that control signals are based on the display conditions selected by a user of the liquid crystal display apparatus.

Lights irradiated by the fluorescent lamps I are mixed in color inside the optical guide plate 4 comprised in the liquid crystal display apparatus 11, and is transmitted to the liquid crystal display panel 6. At this time, judgement is made by using an externally provided chromaticity and brightness measuring apparatus or a visual judgement by user, and then a lighting control signal can be changed as desired by a control mean of the lighting control signal 9. The altered lighting control signals change the driving signals of each fluorescent lamp, and are stored as new setting values in the lighting control signal setting value storage mean 20. The brightness of each fluorescent lamp is changed in accordance with the altered lighting control signals. These changes are then detected by the display state confirmation mean 18, and the lighting control signals for each fluorescent lamp are repeatedly increased and decreased. As a result, a user is able to alter display conditions as is desired by using the control mean of the lighting control signal 19, that is able to be controlled by the user.

(Eighth Embodiment)

Figure 23:
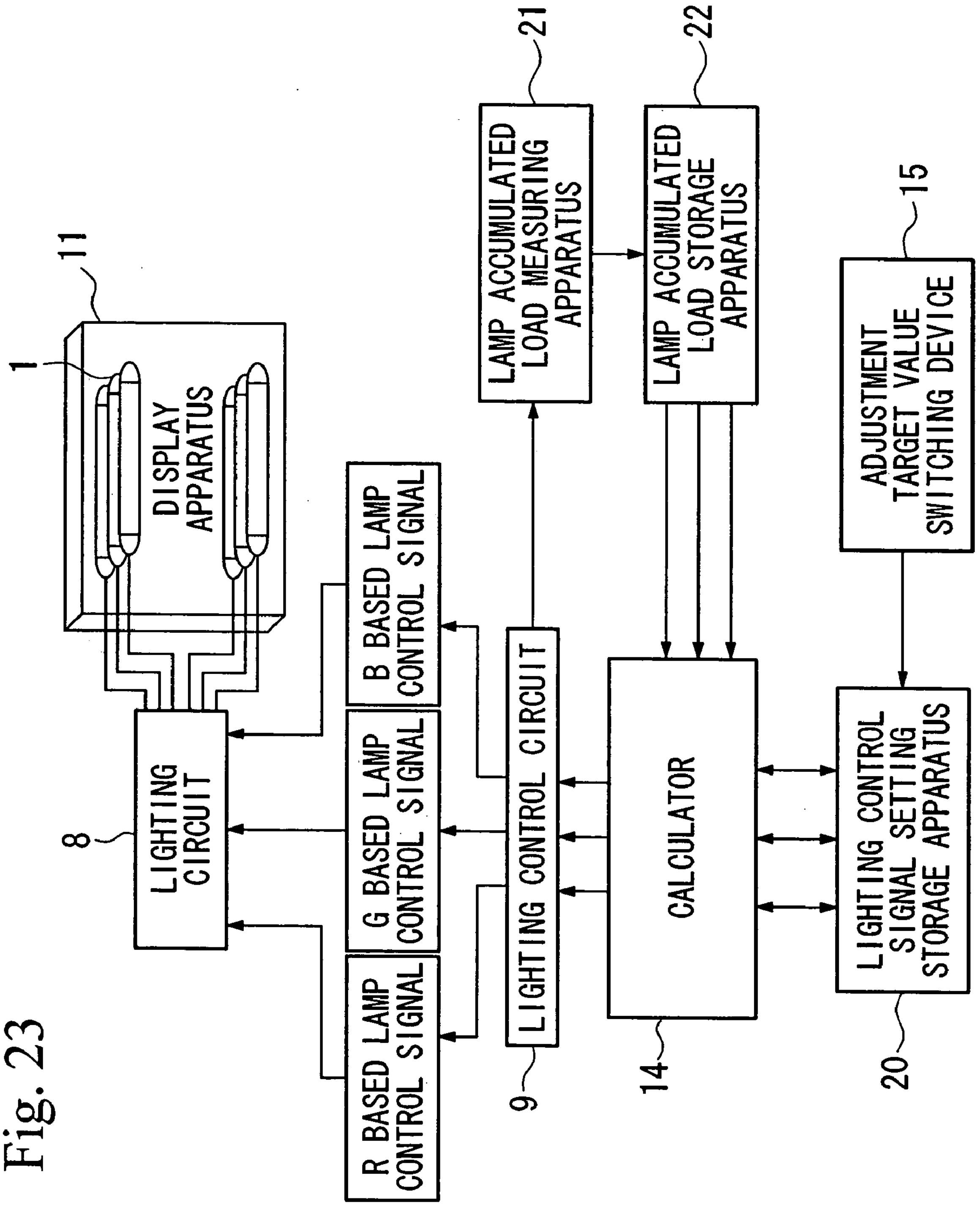
FIG. 23 is a view showing detailed block diagram of a lighting control system of fluorescent lamp 1.

FIG. 23 is a constitutional block diagram in case of using presetting. An accumulated load measuring mean of fluorescent lamp 21 counts the time when the fluorescent lamps are driven by predetermined control signals and calculates the load. An accumulated load storage mean of fluorescent lamp 22 accumulates and stores values calculated by the accumulated load measuring mean of fluorescent lamp 21.

The lighting control signal setting value storage mean 20 has tables of lighting control signal setting values that are needed to achieve the required brightness under condition of brightness decrease caused by the accumulated load of each fluorescent lamp, here, the brightness decrease is calculated in advance from the deterioration characteristics of the phosphors used in each fluorescent lamp. The lighting control signal setting value tables are made by using the calculation method shown in FIG. 18 considering the deterioration characteristics of the red, green, and blue phosphors used in the fluorescent lamp 1 and the mixing ratios of phosphors in each fluorescent lamp. These lighting control signal setting values can be stored for a plurality of display conditions, and the display conditions can be switched by using the adjustment target value switching mean 15 comprising an externally provided control key or the like. The fluorescent lamp 1 is turned on by independent control signals for each reddish, greenish, and bluish fluorescent lamp generated by the lighting control circuit 9 and that control signals are based on the display conditions selected by a user of the liquid crystal display apparatus.

Lights irradiated by the fluorescent lamps 1 are mixed in color inside the optical guide plate 4 comprised in the liquid crystal display apparatus 11, and is transmitted to the liquid crystal display panel 6. The respective control signal information from the lighting control circuit 9 is received by the accumulated load measuring mean of fluorescent lamp 21, and product of the lamp current supplied to each fluorescent lamp, which is calculated using the lighting control signal setting values, and the time those setting values are kept is calculated. The values calculated by the accumulated load measuring mean of fluorescent lamp 21 are stored as accumulated values in the accumulated load storage mean of fluorescent lamp 22.

Each of the red, green, and blue phosphors in the fluorescent lamp 1 deteriorate independently due to the increase of these accumulated values, and a drop in the brightness as well as a change in the chromaticity of each fluorescent lamp is occurred. By comparing the values accumulated in the accumulated load measuring mean of fluorescent lamp 21 with the tables of the drop in brightness that is due to the accumulated load of the fluorescent lamps stored in the lighting control signal setting values storage mean 20 that has been calculated in advance versus the lighting control signal setting values that are needed to achieve the required brightness, the lighting control signal setting value that is needed to satisfy the display conditions selected by a user of the liquid crystal display apparatus is decided, and independent control signals for each reddish, greenish, and bluish fluorescent lamp generated by the lighting control circuit 9 are altered.

By repeating control to alter the independent control signals for each reddish, greenish, and bluish fluorescent lamp generated by the lighting control circuit 9 after decision of the lighting control signal setting value that is needed to satisfy the display conditions selected by a user of the liquid crystal display apparatus by comparing the values accumulated in the accumulated load measuring mean of the fluorescent lamp 21 with the tables of the drop in brightness that is due to the accumulated load of the fluorescent lamps stored in the lighting control signal setting values storage mean 20 that has been calculated in advance, versus the lighting control signal setting values that are needed to achieve the required brightness, the chromaticity and brightness of the liquid crystal display apparatus 11 can be maintained substantially constant without being dependent on differences in the deterioration characteristics of each color phosphor, Note that more efficient adjustments are possible by combining the eighth embodiment with the fifth embodiment.

In the above described embodiments, a case in which fluorescent lamps are used as light source is described as an example, however, the light source are not limited to fluorescent lamps, and it is possible to obtain the same effects when LED, organic EL, or inorganic EL or the like are used for the light sources.

What is claimed is:

1. An image display apparatus comprising a backlight unit that is provided with a plurality of light sources and an image display panel that is placed at a front surface of the backlight unit, and performing monochrome display, wherein the light sources emit at least three different colors light which color coordinates surround a target color's coordinate on a chromaticity diagram, wherein the color coordinates of emitted light from the plurality of light sources are decided by predicting in advance an amount of change that is caused by an accumulation of the length of time the light sources are inactive.

2. The image display apparatus according to claim 1, wherein it is possible to change an emission intensity for each light source independently.

3. The image display apparatus according to claim 1, wherein, in order to improve color uniformity on a display screen, at least one light source has emission spectrums of two or more of the three primary colors of red, green, and blue.

4. The image display apparatus according to claim 1, further comprising a lighting time ratio control, the lighting time ratio control configured to provide: a first step in which an emission intensity ratio of each of the plurality of light sources is determined such that a brightness and chromaticity of the display screen at a time T satisfy desired values; a second step in which a judgement is made as to whether or not the emission intensity ratios are between 0 and 100%; a third step in which, if the emission intensity ratio is between 0 and 100%, then, in each light source it is assumed that a state after a step time $\Delta T$ is equal to a deterioration when lighting has continued for a time (emission intensity ratio×$\Delta T$), and the deterioration in the chromaticity and brightness of each light source at the time $T+\Delta T$ is calculated under assumption that a deterioration after a step time $\Delta T$ with certain emission intensity ratio is equal to a deterioration after a time (emission intensity ratio×$\Delta T$) with 100% emission intensity ratio; and a fourth step in which the brightness of 100% emission intensity ratio and the chromaticity at the time $T=T+\Delta T$ in each light source are calculated, and the amount of change that is caused by an accumulation of the length of time the light sources are inactive is decided by repeating the first step through the fourth step with the time T taken as $T=T+\Delta T$.

5. The image display apparatus according to claim 1, wherein the image display apparatus further comprises: a device that detects emission intensities of the plurality of light sources and a device that increases or decreases emission intensities of the plurality of light sources in accordance with an output from the device that detects emission intensities in order to keep the chromaticity and brightness of the display screen substantially constant.

6. The image display apparatus according to claim 5, wherein the device that detects emission intensities comprises sensors that detect the respective emission intensities of red, green, and blue spectrums independently, and is further provided with a storage means that stores light source control data by which the sensor output is related to the light source emission intensity.

7. The image display apparatus according to claim 1, wherein there is provided a data table of light source control data that is calculated from an emission intensity of each light source deterioration characteristics against emission time of each light source, and each light source is controlled by referring to the data table of light source control data.

8. The image display apparatus according to claim 1, wherein the plurality of light sources are cold cathode fluorescent lamps.

9. The image display apparatus according to claim 8, wherein the cold cathode fluorescent lamps are placed along an outer side of a display area of the image display panel, and greenish cold cathode fluorescent lamps are placed so as to be sandwiched by the cold cathode fluorescent lamps of the other luminescent colors.

10. The image display apparatus according to claim 1, wherein the plurality of light sources are LED lamps.

* * * * *

UNITED STATES PATENT AND TRADEMARK OFFICE

CERTIFICATE OF CORRECTION

PATENT NO. : 7,193,356 B2
APPLICATION NO. : 10/988877
DATED : March 20, 2007
INVENTOR(S) : Hisato Kokubo et al.

It is certified that error appears in the above-identified patent and that said Letters Patent is hereby corrected as shown below:

Title Page item [56]: Foreign Patent Documents:

| | | |
|---|---|---|
| JP | 2001-282190 | 10/2001 |
| JP | 2002-0010653 | 2/2002 |
| JP | 2002209230 | 7/2002 |
| JP | 2002-328048 | 11/2002 |

should read

| | | |
|---|---|---|
| JP | 2001-282190 | 10/2001 |
| KR | 2002-0010653 | 2/2002 |
| JP | 2002209230 | 7/2002 |
| JP | 2002-328048 | 11/2002 |

Signed and Sealed this

Eighteenth Day of March, 2008

JON W. DUDAS
*Director of the United States Patent and Trademark Office*